US010606946B2

(12) United States Patent
Gao et al.

(10) Patent No.: US 10,606,946 B2
(45) Date of Patent: Mar. 31, 2020

(54) LEARNING WORD EMBEDDING USING MORPHOLOGICAL KNOWLEDGE

(71) Applicant: Microsoft Technology Licensing, LLC, Redmond, WA (US)

(72) Inventors: Bin Gao, Beijing (CN); Tie-Yan Liu, Beijing (CN)

(73) Assignee: Microsoft Technology Licensing, LLC, Redmond, WA (US)

(*) Notice: Subject to any disclaimer, the term of this patent is extended or adjusted under 35 U.S.C. 154(b) by 1122 days.

(21) Appl. No.: 14/932,652

(22) Filed: Nov. 4, 2015

(65) Prior Publication Data

US 2017/0011289 A1     Jan. 12, 2017

Related U.S. Application Data

(60) Provisional application No. 62/189,153, filed on Jul. 6, 2015.

(51) Int. Cl.
*G06N 20/00*     (2019.01)
*G06F 17/27*     (2006.01)
*G06N 3/04*     (2006.01)
*G06N 3/08*     (2006.01)

(52) U.S. Cl.
CPC ......... *G06F 17/2755* (2013.01); *G06N 20/00* (2019.01); *G06N 3/0472* (2013.01); *G06N 3/08* (2013.01)

(58) Field of Classification Search
CPC .................................................. G06F 17/2755
See application file for complete search history.

(56) References Cited

U.S. PATENT DOCUMENTS

| 6,405,161 B1* | 6/2002 | Goldsmith | G06F 17/2755 704/9 |
| 8,078,557 B1* | 12/2011 | Ershov | G06F 16/9535 706/19 |
| 8,527,262 B2* | 9/2013 | Kambhatla | G06F 17/2785 434/322 |

(Continued)

OTHER PUBLICATIONS

Spiegler, Sebastian et al.; Learning the Morphology of Zulu with Different Degrees of Supervision; 2008 IEEE; pp. 9-12. (Year: 2008).*

(Continued)

*Primary Examiner* — Stanley K. Hill
(74) *Attorney, Agent, or Firm* — Schwegman Lundberg & Woessner, P.A.

(57) ABSTRACT

In some examples, a machine learning system may use morphological knowledge to enhance a deep learning framework for learning word embedding. The system may consider, among other things, morphological similarities between and among words in a learning process so as to handle new or rare words, edit distances, longest common substring similarities, morpheme similarities, and syllable similarities as morphological knowledge to build a relation matrix between or among words. The system may apply the deep learning framework to query classification, web search, text mining, information retrieval, and natural language processing tasks, for example. The system may accomplish such tasks with relatively high efficiency and speed, while utilizing less computing resources as compared to other systems.

10 Claims, 4 Drawing Sheets

(56) References Cited

U.S. PATENT DOCUMENTS

| | | | |
|---|---|---|---|
| 8,812,296 | B2 | 8/2014 | Selegey et al. |
| 10,296,582 | B2* | 5/2019 | Yao ..................... G06F 17/2755 |
| 2014/0309986 | A1* | 10/2014 | El-Sharqwi ......... G06F 17/2755 |
| | | | 704/9 |

OTHER PUBLICATIONS

Merkx, Marjolein et al.; The acquisition of morphological knowledge investigated through artificial language learning; Psychology Press; The Quarterly Journal of Experimental Psychology 2011, 64(6), 1200-1220. (Year: 2011).*
Spiegler, Sebastian Reiner et al.; Machine Learning for the Analysis of Morphologically Complex Languages; 2011; University of Bristol; (Year: 2011).*
Qiu, Lin et al.; Learning Word Representation Considering Proximity and Amibuity; 2014; Association for the Advancement of Artificial Intelligence; Proceedings of the Twenty-Eighth AAAI Conference on Artificial Intelligence; pp. 1572-1578. (Year: 2014).*
Bengio et al., "Adaptive Importance Sampling to Accelerate Training of a Neural Probabilistic Language Model", in the Journal of IEEE Transaction on Neural Networks, vol. 19, Iss. 4, Apr. 2008, pp. 713-722.
Bengio et al., "Quick Training of Probabilistic Neural Nets by Importance Sampling", in the Proceedings of the Ninth International Workshop on Artificial Intelligence and Statistics, Jan. 2003, 8 pages.
Bian et al., "Knowledge-Powered Deep Learning for Word Embedding", in the Proceedings of the European Conference on Machine Learning and Knowledge Discovery in Databases, Part 1, Sep. 15, 2014, 16 pages.
Blei et al., "Latent Dirichlet Allocation", in the Journal of Machine Learning Research 3, Jan. 2003, pp. 993-1022.
Bordes et al., "Learning Structured Embeddings of Knowledge Bases", in the Proceedings of the 25th AAAI Conference on Artificial Intelligence,Aug. 2011, 6 pages.
Celikyilmaz et al., "Enriching Word Embeddings Using Knowledge Graph for Semantic Tagging in Conversational Dialog Systems", in the Proceedings of the Association for the Advancement of Artificial Intelligence, Jan. 2015, 4 pages.
Chang et al., "Typed Tensor Decomposition of Knowledge Bases for Relation Extraction", in the Proceedings of the 2014 Conference on Empirical Methods in Natural Language Processing, Oct. 2014, 12 pages.
Chen et al., "A Unified Model for Word Sense Representation and Disambiguation", in the Proceedings of the 2014 Conference on Empirical Methods in Natural Language Processing, Oct. 2014, pp. 1025-1035.
Chen et al., "Joint Learning of Character and Word Embeddings", in the Proceedings of the 24th International Joint Conference on Artificial Intelligence, Jul. 2015, 7 pages.
Collobert et al., "A Unified Architecture for Natural Language Processing: Deep Neural Networks with Mutlitask Learning", in the Proceedings of the 25th International Conference on Machine Learning, Jul. 2008, pp. 160-167.
Collobert et al., "Natural Language Processing (Almost) from Scratch", in the Journal of Machine Learning Research, vol. 12, Feb. 1, 2011, pp. 2493-2537.
Creutz et al., "Unsupervised Models for Morpheme Sementation and Morphology Learning", in the Jounal of ACM Transacations on Speech and Language Processing, vol. 4, Iss. 1, Jan. 2007, 34 pages.
Deng et al., "Deep Stacking Networks for Information Retrieval", in the Proceedings of the IEEE International Conference on Acoustics, Speech and Signal Processing, May 2013, 5 pages.
Ehri, "Development of the Ability to Read Words: Update", in the Journal of the Theoretical Models and Processes of Reading, 4th Edition, 1994, pp. 323-358.

Ehri, "Learning to Read Words: Theory, Findings, and Issues", in the Journal of Scientific Studies of Reading, vol. 9, No. 2, 2005, 22 pages.
Fan et al. "Transition-based Knowledge Graph Embedding with Relational Mapping Properties", in the Proceedings of the 28th Pacific Asia Conference on Language, Information, and Computation, Dec. 2014, pp. 328-337.
Finkelstein et al., "Placing Search in Context: The Concept Revisited", in the Proceedings of the ACM Transactions on Information Systems, vol. 20, No. 1, Jan. 2002, pp. 116-131.
Glorot et al., "Domain Adaptation for Large-Scale Sentiment Classification: A Deep Learning Approach", in the Proceedings of the 28th International Conference on Machine Learning, Jun. 28, 2011, 8 pages.
Goswami, Usha, "Children's Use of Analogy in Learning to Read: A Developmental Study", in Journal of Experimental Child Psychology, vol. 42, Iss. 1, Aug. 1986, 16 pages.
Gutmann et al., "Noise-Contrastive Estimation of Unnormalized Statistical Models, with Applications to Natural Image Statistics", in the Journal of Machine Learning Research, vol. 13, Feb. 2012, pp. 307-361.
Hinton et al.,"Distributed Representations", Parallel Distributed Processing: Explorations in the micro-structure of cognition, Ch. 3, MIT Press, Jul. 2015, pp. 77-109.
Hofmann, "Probabilistic Latent Semantic Analysis", in the Proceedings of the Fifteenth Conference on Uncertainty in Artificial Intelligence, Jul. 30, 1999, 8 pages.
Levy et al., "Neural Word Embedding as Implicit Matrix Factorization", in the Proceedings of the Annual Conference on Neural Information Processing Systems, Dec. 2014, 9 pages.
Liang, "Word Hy-phen-a-tion by Com-put-er", Doctoral dissertation, Stanford University, 1983, 62 pages.
Luo et al., "A Study on the CBOW Model's Overfitting and Stability", in the Proceedings of the 5th International Workshop on Web-scale Knowledge Representation Retrieval & Reasoning, Nov. 2014, 4 pages.
Luong et al., "Better Word Represenations with Recursive Neural Networks for Morphology", in the Proceedings of the Seventeenth Conference on Computational Natural Language Learning, Aug. 8, 2013, 10 pages.
Mikolov et al., "Distributed Representations of Words and Phrases and their Compositionality", in the Proceedings of the 27th Annual Conference on Neural Information Processing Systems, Dec. 5, 2013, 9 pages.
Mikolov et al., "Efficient Estimation of Word Represenations in Vector Space", in the Proceedings of the International Conference on Learnings Represenations, May 2, 2013, 12 pages.
Mikolov, "Statistical Language Models Based on Neural Networks", in Doctorate Dissertation, BRNO University of Technology, 2012, 133 pages.
Mnih et al., "A Fast and Simple Algorithm for Training Neural Probabilistic Language Models", in the Proceeding of the 29th International Conference on Machine Learning, Jun. 26, 2012, 8 pages.
Mnih et al., "A Scalable Hierarchical Distributed Language Model", in the Proceedings of the 22nd Annual Conference on Neural Information Processing Systems, Dec. 8, 2008, 8 pages.
Mnih et al., "Learning Word Embeddings Efficiently with Noise-Contrastive Estimation", in the Proceedings of the 27th Annual Conference on Neural Information Processing Systems, Dec. 5, 2013, 9 pages.
Morin et al., "Hierarchical Probabilistic Neural Network Language Model", in the Proceedings of the Tenth International Workshop on Artificial Intelligence and Statistics, Jan. 2005, 7 pages.
Mousa et al., "Morpheme-Based Feature-Rich Language Models using Deep Neural Networks for LVCSR of Egyptian Arabic", in the Proceedings of teh 2013 IEEE International Conference on Acoustics, Speech and Signal Processing, May 2013, 5 pages.
Qiu et al., "Co-learning of Word Representations and Morpheme Representations", in the Proceedings of the 25th International Conference on Computational Linguistics, Aug. 2014, 10 pages.

(56) References Cited

OTHER PUBLICATIONS

Santos et al., "Learning Character-level Representations for Part-of-Speech Tagging", in the Proceeidngs of the 31st International Conference on Machine Learning, Dec. 2014, 9 pages.

Socher et al., "Parsing Natural Scenes and Natural Language with Recursive Neural Networks", in the Proceedings of the 28th Intenrational Conference on Machine Leanring, Jun. 2011, 8 pages.

Socher et al., "Reasoning with Neural Tensor Networks for Knowledge Base Completion", in the Proceedings of the 27th Annual Conference on Neural Information Processing Systems, Dec. 5, 2013, 10 pages.

Sperr et al., "Letter N-Gram-Based Input Encoding for Continuous Space Language Models", in the Proceedings of the Workshop on Continuous Vector Space Models and their Compositionality, Aug. 2013, 10 pages.

Turian et al., "Word Representations: A Simple and General Method for Semi-Supervised Learning", in the Proceedings of the 48th Annual Meeting of the Association for Computational Linguistics, Jul. 2010, 11 pages.

Turney, "Distributional Semantics Beyond Words: Superivsed Learning of Analogy and Paraphrase", in the Proceedings of Transactions of the Association for Computational Linguistics, Oct. 2013, pp. 353-366.

Turney et al., "From Frequency to Meaning: Vector Space Models of Semantics", in the Journal of Artifical Intelligence Research, vol. 37, No. 1, Feb. 2010, pp. 141-188.

Weston et al., "#TagSpace: Semantic Embeddings From Hashtags", in the Proceedings of the Conference on Empriical Methods in Natural Language Processing, Oct. 25, 2014, pp. 1822-1827.

Weston et al., "Connecting Language and Knowledge Bases wtih Embedding Models for Relation Extraction", in the Proceedings of the Conference on Empirical Methods in Natural Language Processing, Oct. 2013, 6 pages.

Yu et al., "Improving Lexical Embeddings with Semantic Knowledge", in the Proceedings of the 52nd Annual Meeting of the Association for Computational Linguistics, vol. 2, Jun. 2014, 6 pages.

Zhong, "Learning Representations for Relation Classification", retrieved on Jul. 6, 2015, available at <<http://web.stanford.edu/class/cs224d/reports/ZhongVictor.pdf>>, 9 pages.

Cui et al., "KNET: A General Framework for Learning Word Embedding using Morphological Knowledge", in the Proceedings of the ACM Transaction on Embedded Computing Systems, vol. 5, Sep. 5, 2014, 30 pages.

Luong et al., "Better Word Representations with Recursive Neural Networks for Morphology", in the Journal of CoNLL, Aug. 8, 2013, 10 pages.

PCT Search Report and Written Opinion dated Oct. 27, 2016 for PCT Application No. PCT/US16/040922, 13 Pages.

\* cited by examiner

LEARNING WORD EMBEDDING USING MORPHOLOGICAL KNOWLEDGE

This claims the benefit of and priority to U.S. Provisional Patent Application No. 62/189,153, filed on Jul. 6, 2015, which is incorporated herein by reference.

BACKGROUND

Data-driven or supervised machine-learning algorithms are emerging as important tools for information analysis in portable devices, the cloud, and other computing devices. Machine learning involves various algorithms that can automatically learn over time. The foundation of these algorithms is built on mathematics and statistics that can be employed to predict events, classify entities, diagnose problems, and model function approximations. Applications of these algorithms include semantic text analysis, web search, and speech and object recognition, just to name a few examples. Supervised machine-learning algorithms typically operate in two phases: training and testing. In the training phase, typical input examples are used to build decision models that characterize the data. In the testing phase, the learned model is applied to new data instances in order to infer different properties such as relevance and similarity.

Generally, a search engine processes a query by directly comparing terms in the query with terms in documents. In some cases, however, a query and a document use different words to express the same concept. The search engine may produce unsatisfactory search results in such circumstances. A search engine may augment a query by finding synonyms of the query terms and adding those synonyms to the query. But this technique may fail to uncover conceptual similarities between a query and a document.

Neural network techniques are widely applied to obtain high-quality distributed representations of words (e.g., word embeddings) to address text mining, information retrieval, and natural language processing tasks. Though some methods may learn word embeddings from context that captures both semantic and syntactic relationships between words, such methods may be unable to handle unseen words or rare words having insufficient context, for example.

SUMMARY

This disclosure describes, in part, techniques and architectures for a system, such as a machine learning system, that uses morphological knowledge to enhance a deep learning framework for learning word embedding. For example, the system may consider, among other things, morphological similarities between and among words in a learning process so as to handle new or rare words, edit distances, longest common substring similarities, morpheme similarities, and syllable similarities as morphological knowledge to build a relation matrix between or among words. The system may apply the deep learning framework to query classification, web search, text mining, information retrieval, and natural language processing tasks, for example. The system may accomplish such tasks with relatively high efficiency and speed, while utilizing less computing resources as compared to other systems.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic (e.g., Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs)), and/or other technique(s) as permitted by the context above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
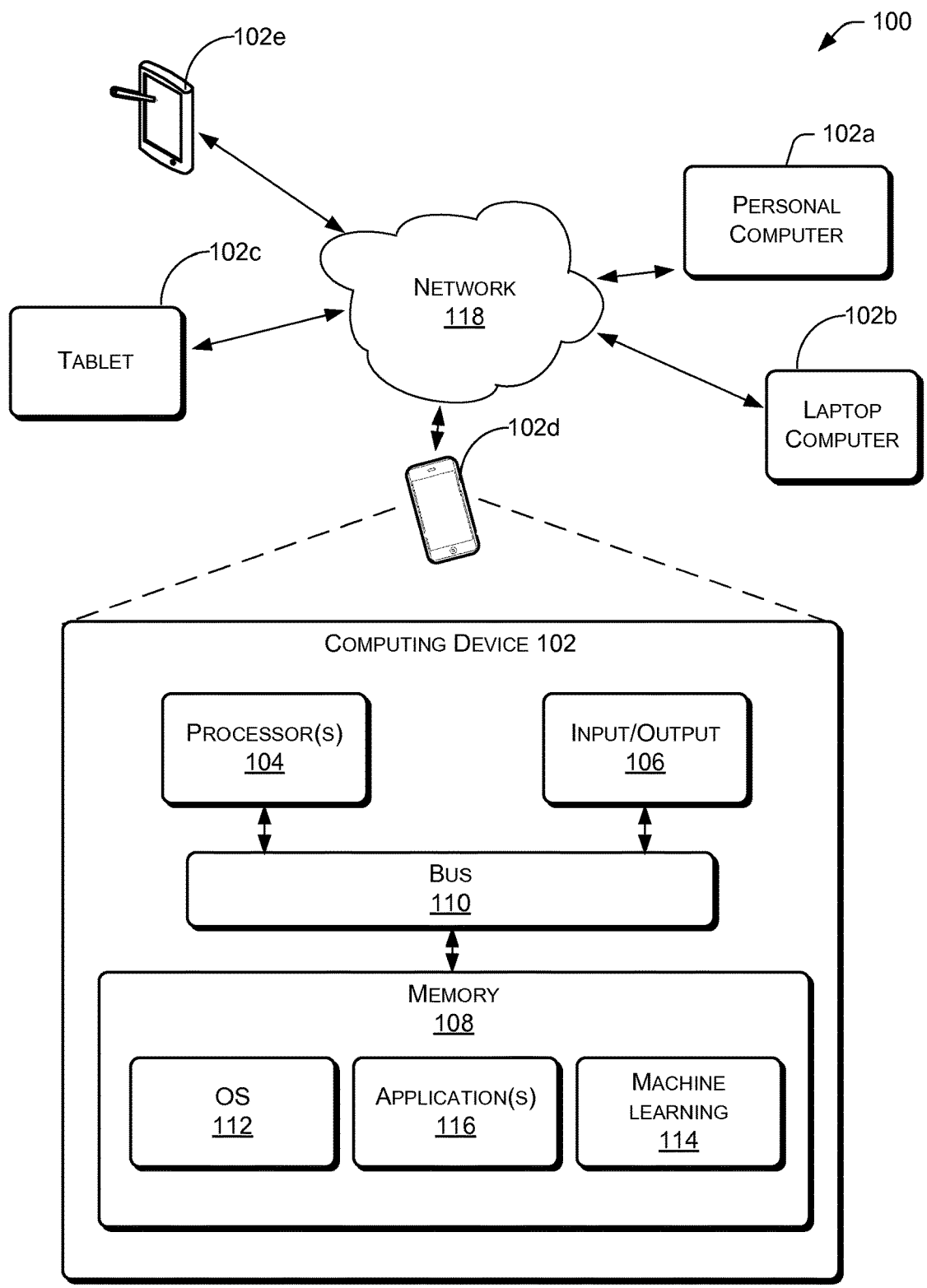
FIG. 1 is a block diagram depicting an example environment in which techniques described herein may be implemented.

Neural network techniques may be used to solve text mining, information retrieval (IR), and natural language processing (NLP) tasks, the basis of which may yield high-quality (e.g., accurate, substantially representative of the meaning of words in a sentence, for example) distributed representations of words, such as word embeddings. Word embedding is a collective name for a set of language modeling and feature learning techniques in natural language processing where words from the vocabulary (and possibly phrases thereof) may be mapped to vectors of real numbers in a space that is low-dimensional relative to the vocabulary size. Methods such as the continuous bag-of-word (CBOW) model and the continuous skip-gram model may leverage the surrounding context of a word in documents to transform words into vectors (i.e., word embeddings) in a continuous space, which may capture both semantic and syntactic relationships between words. In one underlying principle, words that are syntactically or semantically similar may likely have similar surrounding contexts. However, it may be difficult to obtain word embeddings for new not previously seen words since they are not included in the previous vocabulary. Also, the embeddings for rare words may be unreliable due to the insufficient surrounding contexts. Since the aforementioned methods typically adopt statistical methods, when a word has only a few occurrences in the training data, they may fail in extracting statistical clues to correctly map the word into the embedding space.

In contrast, according to the studies on word recognition in cognitive psychology, for example, when a human looks at a word, no matter new or rare, they may be able to figure out effective ways to understand it. For instance, one sometimes conducts phonological recoding through blending graphemes into phonemes and blend syllabic units into recognizable words. One may also analyze the root/affix of the new word so as to build its connections with her known words. Suppose the new word is inconveniently. Given its root and affixes, i.e., in-conveniently, it is natural to guess that it is the adverb form of inconvenient and the latter is probably the antonym of convenient. Thus, morphological word similarity may act as an effective bridge for understanding new or rare words based on known words in the vocabulary. Some embodiments leverage this word recognition process and include using morphological knowledge to enhance a deep learning framework for learning word embedding. In particular, beyond the contextual information already used in CBOW and skip-gram, methods may take advantage of morphological similarity between or among words in a machine learning process so as to handle new or rare words.

Although morphological knowledge may contain valuable information, blindly relying on morphological knowledge may present a risk in that the prediction based on morphological word similarity may be a kind of guess, and there may exist counter examples inconsistent with the guess. For example, if only looking at morphological similarity, one may link convention to convenient since these words share a long substring. However, these two words are neither syntactically nor semantically similar. In this case, limiting consideration to the morphological knowledge, the effectiveness of the learned word embeddings may be relatively poor. To tackle this issue, methods may leverage the findings regarding word recognition in cognitive psychology. It has been revealed that humans may take advantage of the contextual information (both the context at the reading time and the context in their memory) to correct unreliable morphological word similarity. By comparing their respective contexts, one can distinguish between convenient and convention and weaken the morphological connection between these two words in their mind. Some example methods described in this application may leverage context to update morphological knowledge during a machine learning process. Specifically, methods need not fully trust the morphological knowledge, and may change the morphological knowledge so as to maximize the consistency between contextual information and morphological word similarity, for example.

In various embodiments, methods, which can improve performance of computer systems or networks, for example, involve developing a neural network architecture that can leverage morphological word similarity for word embedding. Such methods may involve a contextual information branch and a morphological knowledge branch. On one hand, the methods may include a type of skip-gram model as a contextual information branch, which may be relatively efficient and effective. On the other hand, the methods may consider edit distances, longest common substring similarities, morpheme similarities, and/or syllable similarities as morphological knowledge to build a relation matrix between or among words, and put the relation matrix into the morphological knowledge branch. These two branches may share the same word embedding space, and they may be combined together using tradeoff coefficients in order to feed forward to an output layer to predict the target word. A back propagation stage may modify the tradeoff coefficients, word embeddings, and/or the weights in the relation matrix layer by layer. This proposed framework is called "KNET" (e.g., Knowledge-powered neural NETwork). Methods involving KNET may, in addition to improving processing speed and accuracy, help produce improved word representations as compared with methods on an analogical reasoning task and a word similarity task, for example.

In some embodiments, a neural network framework called KNET may effectively leverage both contextual information and morphological knowledge to learn word embeddings. The KNET framework may learn high quality word embeddings, such as for rare words and new words, with the use of morphological knowledge, even if the knowledge is somewhat unreliable. In some implementations, KNET may benefit from noisy knowledge and balance between contextual information and morphological knowledge.

Various examples are described further with reference to FIGS. 1-7.

The environment described below constitutes but one example and is not intended to limit the claims to any one particular operating environment. Other environments may be used without departing from the spirit and scope of the claimed subject matter.

FIG. 1 illustrates an example environment 100 in which example processes involving representation learning as described herein can operate. In some examples, the various devices and/or components of environment 100 include a variety of computing devices 102. By way of example and not limitation, computing devices 102 may include devices 102a-102e. Although illustrated as a diverse variety of device types, computing devices 102 can be other device types and are not limited to the illustrated device types. Computing devices 102 can comprise any type of device with one or multiple processors 104 operably connected to an input/output interface 106 and memory 108, e.g., via a bus 110. Computing devices 102 can include personal computers such as, for example, desktop computers 102a, laptop computers 102b, tablet computers 102c, telecommunication devices 102d, personal digital assistants (PDAs) 102e, electronic book readers, wearable computers, automotive computers, gaming devices, etc. Computing devices 102 can also include business or retail oriented devices such as, for example, server computers, thin clients, terminals, and/or work stations. In some examples, computing devices 102 can include, for example, components for integration in a computing device, appliance, or other sorts of devices.

In some examples, some or all of the functionality described as being performed by computing devices 102 may be implemented by one or more remote peer computing devices, a remote server or servers, or a cloud computing resource. In some examples, a computing device 102 may comprise an input port to receive an object representing linguistic information. Computing device 102 may further comprise one or multiple processors 104 to represent the object as an n-dimensional representation, for example.

In some examples, as shown regarding device 102d, memory 108 can store instructions executable by the processor(s) 104 including an operating system (OS) 112, a machine learning module 114, and programs or applications 116 that are loadable and executable by processor(s) 104. The one or more processors 104 may include one or more central processing units (CPUs), graphics processing units (GPUs), video buffer processors, and so on. In some implementations, machine learning module 114 comprises executable code stored in memory 108 and is executable by processor(s) 104 to collect information, locally or remotely by computing device 102, via input/output 106. The information may be associated with one or more of applications 116. Machine learning module 114 may selectively apply any of a number of machine learning decision models stored in memory 108 (or, more particularly, stored in machine learning 114) to apply to input data.

Though certain modules have been described as performing various operations, the modules are merely examples and the same or similar functionality may be performed by a greater or lesser number of modules. Moreover, the functions performed by the modules depicted need not necessarily be performed locally by a single device. Rather, some operations could be performed by a remote device (e.g., peer, server, cloud, etc.).

Alternatively, or in addition, some or all of the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

In some examples, computing device 102 can be associated with a camera capable of capturing images and/or video and/or a microphone capable of capturing audio. For example, input/output module 106 can incorporate such a camera and/or microphone. Images of text, for example, may be converted to editable text and entered into a database that includes words, phrases, and/or sentences. Audio of speech may be converted to editable text and entered into the database that includes words, phrases, and/or sentences. Memory 108 may include one or a combination of computer readable media.

Computer readable media may include computer storage media and/or communication media. Computer storage media includes volatile and non-volatile, removable and non-removable media implemented in any method or technology for storage of information such as computer readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device.

In contrast, communication media embodies computer readable instructions, data structures, program modules, or other data in a modulated data signal, such as a carrier wave, or other transmission mechanism. As defined herein, computer storage media does not include communication media. In various examples, memory 108 is an example of computer storage media storing computer-executable instructions. When executed by processor(s) 104, the computer-executable instructions configure the processor(s) to, among other things, represent an input word as an n-dimensional representation; find a set or group of words that are morphologically similar to the input word; extract embedding of individual words among the set of words from an embedding matrix based, at least in part, on contextual information associated with the input word; and generate a target word having a meaning based, at least in part, on the set of words and the contextual information.

In various examples, an input device of input/output (I/O) interfaces 106 can be a direct-touch input device (e.g., a touch screen), an indirect-touch device (e.g., a touch pad), an indirect input device (e.g., a mouse, keyboard, a camera or camera array, etc.), or another type of non-tactile device, such as an audio input device.

Computing device(s) 102 may also include one or more input/output (I/O) interfaces 106 to allow the computing device 102 to communicate with other devices, which may be on a network 118, for example. I/O interfaces 106 can include one or more network interfaces to enable communications between computing device 102 and other networked devices included in network 118. Such other devices may include user input peripheral devices (e.g., a keyboard, a mouse, a pen, a game controller, a voice input device, a touch input device, gestural input device, and the like) and/or output peripheral devices (e.g., a display, a printer, audio speakers, a haptic output, and the like).

Figure 2:
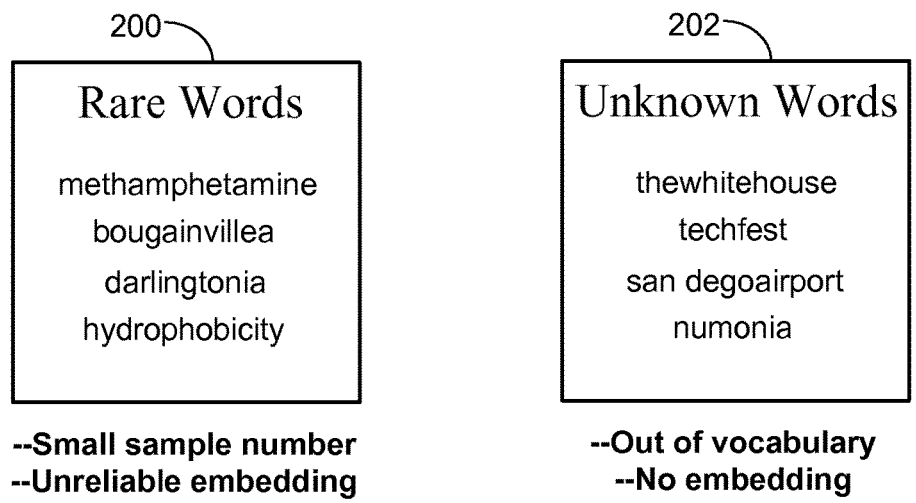
FIG. 2 is a block diagram including lists of example rare and unknown words.

FIG. 2 is a block diagram including, a partial list 200 of example rare words and a partial list 202 of example unknown words. Though examples and descriptions of embodiments are for English, claimed subject matter is not limited to any particular language. Herein, for a particular language, "rare" words are words that are spoken and/or written relatively few times across a population of people. Though "rare" is a relative concept, in some particular examples, for a large text corpus such as a whole set of English Wikipedia® articles, a word may be considered to be rare if its number of occurrences is less than 50 or so. For a smaller text corpus, such a threshold may be accordingly smaller. In some fields of study or for some people, particular rare words may be used relatively often but, for the population overall, such words are rarely used as compared with most words of a vocabulary of the language. For example, rare words list 200 includes the word "methamphetamine", which may be used often in the medical field, "darlingtonia" may be used often in botany, and so on. But such words are not often used across the general population.

Relatively infrequent usage of rare words generally leads to a small sample number for individual rare words. Thus, during a machine learning process, for example, insufficient training data may result in unreliable word embedding for rare words.

Herein, for a particular language, "unknown" words may include misspelled or mistyped words, two or more words combined without a space, new words, phonetic representations of words, or words that are made up by a user(s), just to name a few examples. For example, unknown words list 202 includes the word "thewhitehouse", which likely comprises the words "the" and "Whitehouse" without an adjoining space, "numonia" is likely a misspelling of "pneumonia", and so on. Generally, because unknown words are out of vocabulary, word embedding for unknown words presents challenges. For example, during a machine learning process, training data may include one or a few occurrences of a particular unknown word. Such a situation may not allow for word embedding for the particular unknown word.

In some embodiments, a machine learning process may include learning words and understanding text by leveraging morphological knowledge, thus allowing for effective word embedding. For example, knowledge-powered neural network architecture may be used for learning effective word embedding based, at least in part, on both contextual information and morphological knowledge.

In some embodiments, a processor may use a word recognition process by learning some basic words and gradually enlarge its vocabulary during the learning process. The processor may also build cross links between words in its knowledge base by learning the language grammars and morphological knowledge. For example, the processor may learn that the adjective form of care is careful and its adverb form is carefully. When encountering an unknown or unfamiliar word, the processor may explore several different techniques to recognize it.

For example, using a recoding (or decoding) technique, a person may either sound out and blend graphemes into phonemes, or work with larger chunks of letters to blend syllables into recognizable words. For example, psychology may be pronounced as psy-cho-lo-gy, in which psy means know or study, cho means mind or soul, and logy means academic discipline. Thus, one may guess psychology is an academic discipline that studies something in the mind or soul.

In another technique, called analogizing, a person may use words they know to read a new word. If the new word is morphologically similar to several known words, they may guess the meaning of the new word based on the meanings of these known words. For example, admob appears in a news article as a new word to a reader. The reader may understand that admob is related to advertisements on mobile devices because admob comprises ad and mob, which are substrings of advertisement and mobile, respectively.

In another technique, called prediction, a person may use context and letter clues to directly guess the meaning of an unknown word. For example, one may retrieve the context of the word in their memory and recognize associations with the current context to guess the meaning of the word. In a particular example, inmate is an unknown word to a reader, but according to the context Inmates and police officers held a basketball game in the Fox River Prison last Tuesday evening, the reader may guess that inmate means prisoner in the sentence.

In the word recognition process described above, the different techniques may reinforce each other. On one hand, sometimes contexts may be insufficient for the prediction technique, such as when there are too few contexts surrounding an unknown word and there is no historical context in one's memory. In such a case, directly predicting the meaning of the unknown word may be relatively difficult. In contrast, decoding and analogizing techniques may perform well at prediction since these techniques can operate in a context-free manner. On the other hand, sometimes decoding and analogizing techniques may result in errors. For example, convention and convenient are morphologically similar since they share a long substring conven. However, their meanings are different. In this case, relying only on morphological knowledge may introduce noises (e.g., errors), but contextual information may help one to successfully distinguish between these two words. By refining their morphological knowledge with the help of contextual information, one may avoid misrecognition or misinterpretation of words.

In some embodiments, processes performed by humans, described herein as examples, may occur within a second, which enables humans to be efficient at recognizing unknown or unfamiliar words. This phenomenon allows some methods described herein to leverage both morphological knowledge and contextual information to learn word embeddings. Accordingly, a neural network architecture may comprise a morphological knowledge branch and a contextual information branch, as described below.

In some embodiments, a neural network architecture may leverage both contextual information and morphological knowledge to learn word embedding. Methods may use a skip-gram model as the basis of a framework. Skip-gram is a neural network model for learning word representations. An underlying principle of the skip-gram model is that similar words should have similar contexts. In the field of computational linguistics, in particular language modeling, skip-grams are a generalization of n-grams in which components (e.g., words) need not be consecutive in the text under consideration, but may leave gaps that are skipped over.

In some examples, given a sequence of training words $w_1, w_2, \ldots, w_T$, the objective of the skip-gram model is to maximize the following average log probability, $$(1/T)\Sigma\Sigma[\log p(w_{t+j}|w_t)] \qquad \text{Equation 1}$$

where the right summation is over $\{-N \leq j \leq N, j \neq 0\}$ and the left summation is from $t=1$ to $T$, where $T$ is the total number of training words. In other words, $T$ may be equal to the total text length of a whole training text stream. Also, $w_I$ denotes the input word (i.e., $w_t$), $w_O$ denotes the output word (i.e., $w_{t+j}$), and $N$ indicates the size of the sliding window by $2N+1$. The conditional probability $p(w_{t+j}|w_t)$ in Equation 1 is defined using the following softmax function, $$p(w_O|w_I) = \exp(v'^T_{wO} \cdot v_{wI})/\Sigma \exp(v'^T_w \cdot v_{wI}) \qquad \text{Equation 2}$$

where $v_w$ and $v'_w$ are the input and output representation vectors of $w$, and the sum in the denominator is over all words $w$ in the vocabulary.

It may be difficult or impractical to directly optimize the above objective of the skip-gram model because computing the derivative may be proportional to the vocabulary size, which is often very large. Several techniques may be employed to tackle this difficulty. In one technique, noise-contrastive estimation (NCE) is directed to fitting un-normalized probabilistic models. NCE may approximate the log probability of the softmax function by performing logistic regression to discriminate between the observed data and some artificially generated noises. Another (simpler) technique is negative sampling objective (NEG).

By using NEG, the softmax conditional probability $p(w_{t+j}|w_t)$ may be replaced by $$J(\Theta) = \log \sigma(v'^T_{wO} \cdot v_{wI}) + \Sigma \hat{E}_{wi \sim Pn(w)}[\log \sigma(-v'^T_{wi} \cdot v_{wI})] \qquad \text{Equation 3}$$

where the summation is over $i=1$ to $k$, and where $\Theta$ is the model parameter including the word embeddings, $\sigma$ denotes the logistic function, and $Pn(w)$ represents the noise distribution which is set as the ¾ power of the unigram distribution $U(w)$, i.e., $Pn(w) = U(w)^{3/4} = Z$, where $Z$ is a normalizer. Accordingly, the gradient of $J$ may be estimated by computing $$(\partial/\partial\Theta)J(\Theta) = (1 - \sigma(v'^T_{wO} \cdot v_{wI})) \cdot (\partial/\partial\Theta)(v'^T_{wO} \cdot v_{wI}) - \Sigma[\sigma(v'^T_{wi} \cdot v_{wI}) \cdot (\partial/\partial\Theta)(v'^T_{wi} \cdot v_{wI})] \qquad \text{Equation 4}$$

where the summation is over $i=1$ to $k$, where $k$ is the number of noise samples.

By summing over $k$ noise samples instead of a sum over the entire vocabulary, the training time yields a linear scale to the number of noise samples and becomes independent of the vocabulary size.

Figure 3:
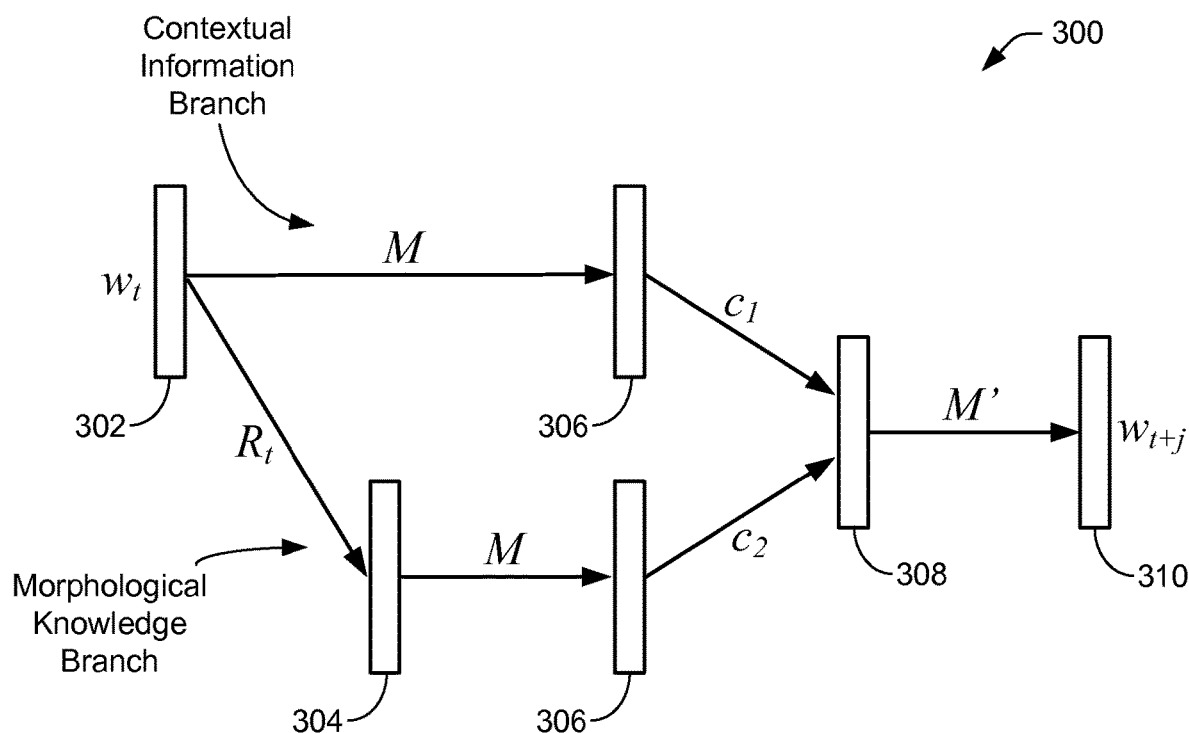
FIG. 3 is a schematic representation of a neural network architecture of an example implementation of the environment of FIG. 1.

FIG. 3 is a schematic representation of a neural network architecture 300 of an example implementation of the environment of FIG. 1. For example, processor(s) 104 may perform at least some aspects involved with neural network architecture 300.

To incorporate morphological knowledge into the learning process, a method that includes a neural network architecture may be used. Beyond the basic skip-gram model that predicts a target word based on its context, the neural network architecture includes a contextual information branch and a parallel morphological knowledge branch, which leverages morphological knowledge to assist in predicting a target word. Intuitively, if a word $w_t$ of a vocabulary space 302 is the central word in a context window, the method may predict, in the contextual information branch, the surrounding words by leveraging not only the representation of word $w_t$ as contextual information, but also the representations of the words that are morphologically similar to $w_t$, as determined in the morphological knowledge branch. An objective of the method using the neural network architecture is analogous to operations set forth by equation 1 (e.g., maximize the average probability of word prediction) except that the method replaces the input word representation $v_{wI}$ in softmax given by Equation 2 by a new formulation that may be combined from both the contextual information branch and the morphological knowledge branch. Detailed formulation of $v_{wI}$ is described below.

A representation of a central word $w_t$ may be obtained from the morphological knowledge branch by finding the set of words in the vocabulary space 304 that are morphologically similar to $w_t$. In some implementations, $w_t$ and the morphologically similar one or more words may each be represented by a one-hot vector (e.g., a vector having all elements except one being zero). Vocabulary space 302 may be the same size as vocabulary space 304. Such a set of words may be represented by a relation matrix $R_t$. Then, the method may extract the embedding of each word in $R_t$ from an embedding matrix M shared with the contextual information branch, leading to an embedding space 306, which may have a size substantially less than those of vocabulary spaces 302 and 304. Subsequently, a corresponding knowledge representation of $R_t$ may be computed by feeding forward a relationship layer, which may be written as $$v_{Rt} = \Sigma s(w_t, w) \cdot v_w \quad \text{Equation 5}$$

where $s(w_t, w)$ is the similarity score. If two words are similar, for example, one can replace one word by the other in a context without bringing changes or confusion in the meaning of a corresponding sentence. Methods of computing $v_{Rt}$ are discussed below. In some cases, $v_w$ is the i-th row of matrix M, where i is the index of the word w in the vocabulary space 302, and $s(w_1, w_2)$ is the element of relation matrix $R_t$ at (i,j), which are the indices of words $w_1$ and $w_2$ respectively. To help ensure the quality of morphological knowledge and control the number of parameters, the method may leverage the top words with highest morphological similarity scores to build $R_t$. For example, in a particular sparse structure implementation, an input word $w_t$ may connect to at most five words in a relationship layer. This sparse structure may not change during training, and the weights of these connections may be updated. Therefore, the method need not suffer from a large number of parameters even if $R_t$ is learned.

An aggregated representation of the input word, denoted as $v_{wI}$, may be calculated as a weighted sum of the representations from the contextual information branch and the morphological knowledge branch:

$$v_{wI} = c_1(w_t)v_{wt} + c_2(w_t)v_{Rt} \quad \text{Equation 6}$$

where $c_1$ and $c_2$ are the functions of $w_t$ and yield relatively high dependency on the word frequency. A result may lead to an embedding space 308, which may be the same size as embedding space 306. Intuitively, frequent words may be associated with many more training samples as compared with the case of rare words. Thus, it may be relatively easy to collect rich contextual information for frequent words while the contextual information for rare words may be insufficient. In contrast, the volume of morphological knowledge of a word often has little correlation to the word frequency. Thus, rare words may still rely more on morphological knowledge than on contextual information because contextual information for rare words may not be reliable. Therefore, the functions $c_1$ and $c_2$ may likely be related to word frequency. Specifically, the method may divide the words into a number of buckets according to their respective frequencies, and all the words in the same bucket may share the same values of $c_1$ and $c_2$.

One intuitive way to interpret the above model is as follows. For each word $w_t$, the method may use one row in the embedding matrix M to encode its contextual embedding. In addition, by using matrix $R_t$, the method may identify words that are morphologically similar to $w_t$. The method may also extract contextual embedding vectors of these similar words from matrix M and take the weighted average of these embedding vectors as the morphological embedding for the original word $w_t$. The overall embedding of $w_t$ may be computed as a weighted combination of its contextual embedding and morphological embedding. A matrix M' may be used to predict the surrounding word $w_{t+j}$ in a vocabulary space 310 based, at least in part, on the overall embedding of $w_t$. In a back-propagation process, the parameters in M, $R_t$, M', and multiple pairs of $c_1$ and $c_2$ (e.g., corresponding to different frequency buckets) may be updated. If the training process converges, the method may take the matrix M as the learned word embeddings. In some implementations, the method may take the NEG strategy to calculate the gradient in equation 4 in which $v_{wI}$ is substituted by Equation 6, and learn the parameters with standard gradient descent techniques, for example.

As compared to skip-gram, in various embodiments, methods involve a morphological knowledge branch, as described above, for example. In some implementations, the morphological knowledge branch may use four types, among others, of naturally defined morphological knowledge parameters. These types include Edit Distance Similarity (Edit), Longest Common Substring Similarity (LCS), Morpheme Similarity (Morpheme), and Syllable Similarity (Syllable).

Edit distance provides a technique for quantifying how dissimilar two strings (e.g., words) are by counting the minimum number of operations required to transform one string into the other. The operations may include letter insertion, letter deletion, or letter substitution, for example. The edit distance similarity score may be calculated for two words $w_1$ and $w_2$ as $$s_{Edit}(w1, w2) = 1 - d(w_1, w_2)/(\max(l(w_1), l(w_2)) \quad \text{Equation 7}$$

where $d(w_1, w_2)$ represents the edit distance of the two words and $l(w_1)$, $l(w_2)$ are the corresponding word lengths.

Longest common substring similarity may be defined as the ratio of the length of the longest shared substring of two words (denoted by $g(w_1, w_2)$) and the length of the longer word, i.e.

$$s_{LCS}(w1, w2) = g(w_1, w_2)/(\max(l(w_1), l(w_2))) \quad \text{Equation 8}$$

Morpheme similarity may be calculated based on the shared roots (or stems) and affixes (prefix and suffix) of two words. Suppose each word of $w_1$ and $w_2$ can be split into a set of morphemes (denoted by $F(w_1)$ and $F(w_2)$), then the morpheme similarity of the two words may be calculated as $$s_{Morpheme}(w1, w2) = |F(w_1) \cap F(w_2)|/\max(|F(w_1)|, |F(w_2)|) \quad \text{Equation 9}$$

where the symbol || indicates an operation that outputs the size of the set of morphemes.

Syllable similarity may be calculated based on shared syllables of two words. Suppose both $w_1$ and $w_2$ can be split into a set of syllables (denoted by $G(w_1)$ and $G(w_2)$), then the syllable similarity of the two words may be calculated as $$s_{Syllable}(w1, w2) = |G(w_1) \cap G(w_2)|/\max(|G(w_1)|, |G(w_2)|)$$

Equation 10

Any combination of the above four types of morphological knowledge parameters may be used or they may be used separately.

Figure 4:
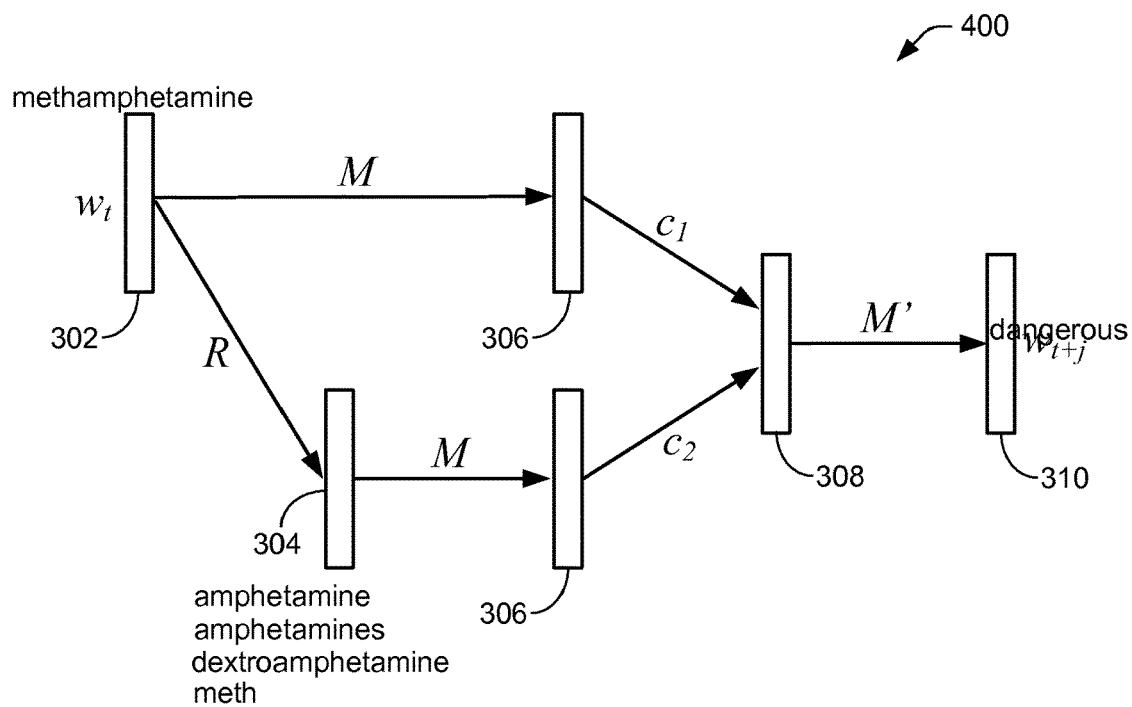
FIG. 4 is a schematic representation of the neural network architecture of FIG. 3 operating with an example input word.

FIG. 4 is a schematic representation of the neural network architecture 300 of FIG. 3 operating with an example input word methamphetamine. Of course, any word, common, rare, or unknown, may be applied to such a neural network architecture, and claimed subject matter is not so limited.

A representation of methamphetamine (e.g., $w_t$) may be obtained from the morphological knowledge branch by finding the set of words in the vocabulary space 304 that are morphologically similar to $w_t$, such as amphetamine, amphetamines, dextroamphetamine, and meth, for example. Such a set of words may be represented by relation matrix $R_t$. The method may extract the embedding of amphetamine, amphetamines, dextroamphetamine, and meth from embedding matrix M shared with the contextual information branch, leading to an embedding space 306. Each word of matrix $R_t$ may be applied to a relationship layer (e.g., Equation 5). For example, such a relationship layer may yield, for meth in relation matrix $R_t$, the phrase " . . . crystal meth is a highly addictive drug that comes in clear, chunky crystals . . . ." Thus phrase includes a relationship between meth and drug. In a process that may be performed in parallel with the morphological knowledge branch, the contextual information branch may yield the phrase " . . . methamphetamine has dangerous effects on the body as it can increase . . . ." Since mesh or drug may have been associated with dangerous in many other sentences, subsequently, a weighted sum (e.g., Equation 6) may yield the target word dangerous.

Figure 5:
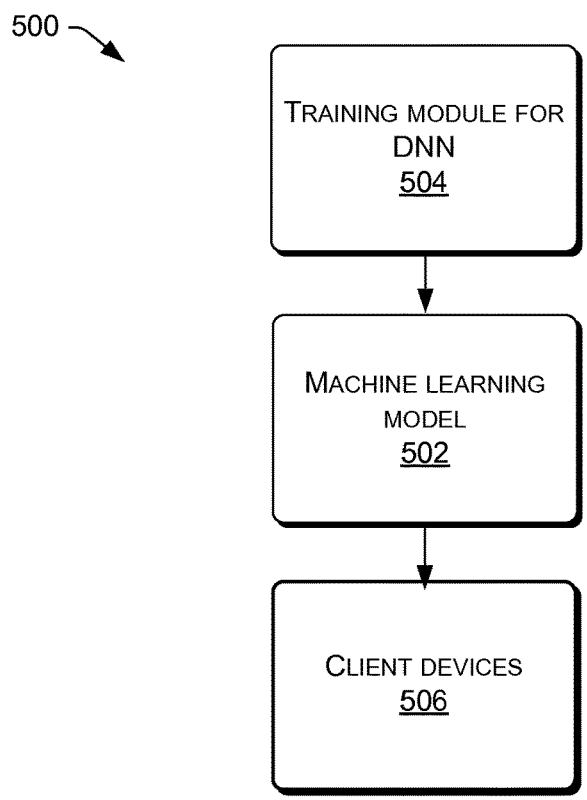
FIG. 5 is a block diagram of an example machine learning system.

FIG. 5 is a block diagram of a machine learning system 500, according to various examples. Machine learning system 500 includes a machine learning model 502, a training module 504 for a deep neural network (DNN), and a number of client devices 506, any of which may access one or more databases. Machine learning model 502 may receive training data from offline training module 504. For example, training data can include data from a population, such as a population of elements in a database. A training system, for example, may be the same as or similar to training module 504. Data from the population may be used to train machine learning model 502. Subsequent to such training, machine learning model 502 can be employed in client devices 506. Thus, for example, training using the data from the population for offline training can act as initial conditions for the machine learning model. Other techniques for training, such as those involving virtual evidence, described below, may be used.

Figure 6:
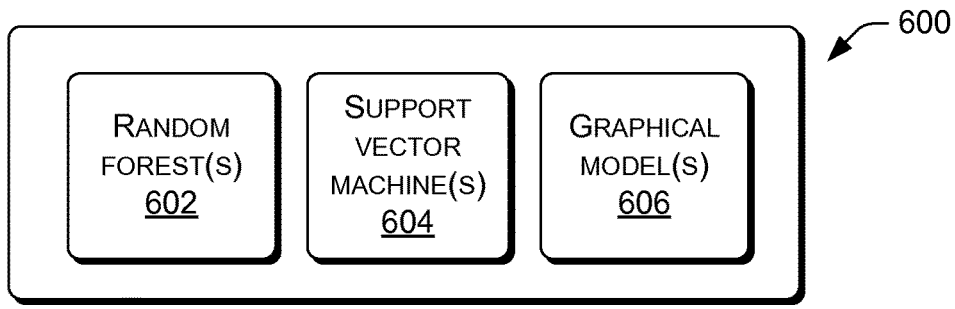
FIG. 6 is a block diagram of example machine learning models.

FIG. 6 is a block diagram of a machine learning model 600, according to various examples. Machine learning model 600 may be the same as or similar to machine learning model 502 shown in FIG. 5. Machine learning model 600 includes any of a number of functional blocks, such as random forest block 602, support vector machine block 604, and graphical models block 606, which may be applied to a deep neural network model, for example. Random forest block 602 can include an ensemble learning method for classification that operates by constructing decision trees at training time. Random forest block 602 can output the class that is the mode of the classes output by individual trees, for example. Random forest block 602 can function as a framework including several interchangeable parts that can be mixed and matched to create a large number of particular models. Constructing a machine learning model in such a framework involves determining directions of decisions used in each node, determining types of predictors to use in each leaf, determining splitting objectives to optimize in each node, determining methods for injecting randomness into the trees, and so on.

Support vector machine block 604 classifies data for machine learning model 600. Support vector machine block 604 can function as a supervised learning model with associated learning algorithms that analyze data and recognize patterns, used for classification and regression analysis. For example, given a set of training data, each marked as belonging to one of two categories, a support vector machine training algorithm builds a machine learning model that assigns new training data into one category or the other.

Graphical models block 606 functions as a probabilistic model for which a graph denotes conditional dependence structures between random variables. Graphical models provide algorithms for discovering and analyzing structure in distributions and extract unstructured information. Applications of graphical models include information extraction, speech recognition, computer vision, and decoding of low-density parity-check codes, just to name a few examples.

Figure 7:
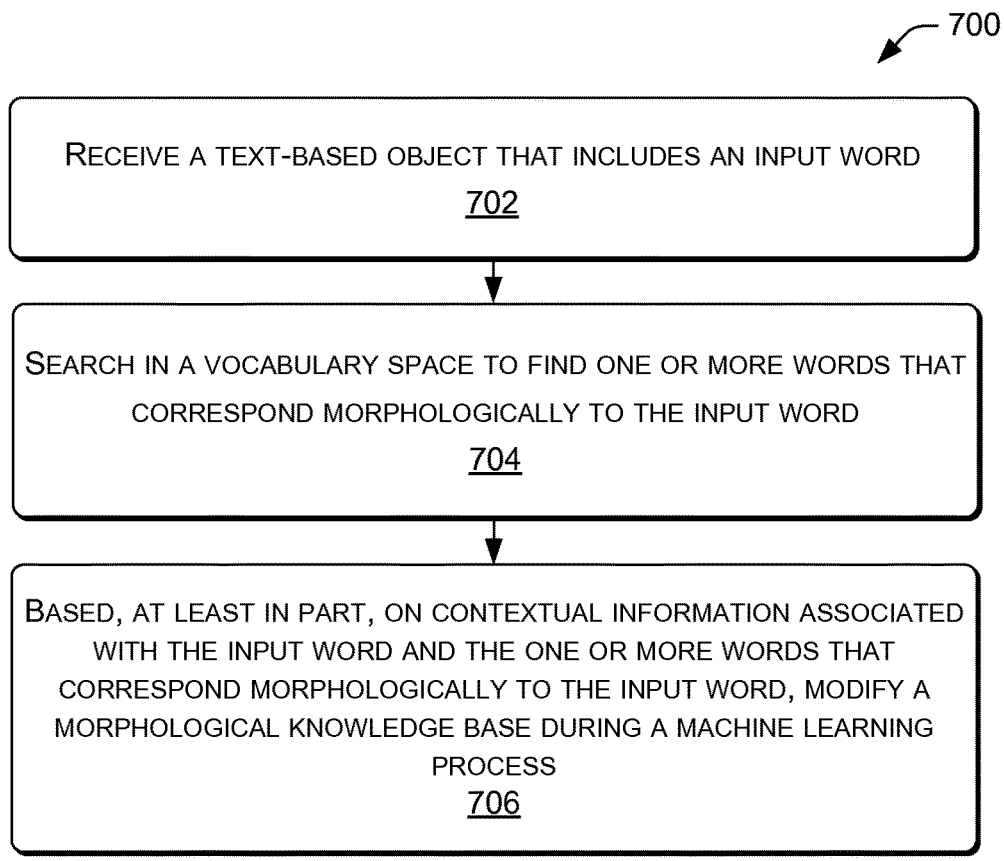
FIG. 7 is a flow diagram of an example machine learning process.

FIG. 7 is a flow diagram of an example machine learning process 700 that may be performed by a processor. For example, process 700 may be performed by computing device 102, illustrated in FIG. 1. At block 702, the processor may receive a text-based object that includes an input word, such as central word $w_t$ described for FIG. 3. At block 704, the processor may search in a vocabulary space to find one or more words that correspond morphologically to the input word. For example, such a search may be applied to vocabulary space 304 in FIG. 3. At block 706, the processor may, based at least in part, on contextual information associated with the input word and the one or more words that correspond morphologically to the input word, modify a morphological knowledge base during a machine learning process.

The flow of operations illustrated in FIG. 7 is illustrated as a collection of blocks and/or arrows representing sequences of operations that can be implemented in hardware, software, firmware, or a combination thereof. The order in which the blocks are described is not intended to be construed as a limitation, and any number of the described operations can be combined in any order to implement one or more methods, or alternate methods. Additionally, individual operations may be omitted from the flow of operations without departing from the spirit and scope of the subject matter described herein. In the context of software, the blocks represent computer-readable instructions that, when executed by one or more processors, configure the processor(s) to perform the recited operations. In the context of hardware, the blocks may represent one or more circuits (e.g., FPGAs, application specific integrated circuits—ASICs, etc.) configured to execute the recited operations.

Any routine descriptions, elements, or blocks in the flows of operations illustrated in FIG. 7 may represent modules, segments, or portions of code that include one or more executable instructions for implementing specific logical functions or elements in the routine.

Example Clauses

A, a system comprising: one or more processors; and memory storing instructions that, when executed by the one or more processors, configure the one or more processors to perform operations comprising: receiving a text-based object that includes an input word; searching in a vocabulary space to find one or more words that correspond morphologically to the input word; receiving contextual information associated with the input word and the one or more words that correspond morphologically to the input word; and based, at least in part, on the contextual information associated with the input word and the one or more words that correspond morphologically to the input word, modifying a morphological knowledge base during a machine learning process.

B. The system as paragraph A recites, wherein the operations further comprise: searching in a vocabulary space; and calculating morpheme similarity between or among the input word and the one or more words that correspond morphologically to the input word.

C. The system as paragraph A recites, wherein the operations further comprise: searching in a vocabulary space; and calculating syllable similarity between or among the input word and the one or more words that correspond morphologically to the input word.

D. The system as paragraph A recites, wherein the operations further comprise predicting a target word or phrase having a meaning based, at least in part, on the contextual information and the one or more words that correspond morphologically to the input word.

E. The system as paragraph A recites, wherein the operations further comprise determining the contextual information associated with the input word in a process that is parallel with and independent from determining the one or more words that correspond morphologically to the input word.

F. The system as paragraph E recites, wherein the operations further comprise calculating a weighted sum of a representation of the contextual information and a representation of the one or more words that correspond morphologically to the input word.

G. The system as paragraph A recites, wherein the input word and the one or more words that correspond morphologically to the input word are each represented by a one-hot vector.

H. The system as paragraph A recites, wherein the one or more words that correspond morphologically to the input word are collectively represented by a matrix.

I. The system as paragraph A recites, wherein the operations further comprise extracting the one or more words that correspond morphologically to the input word from one or more natural language text sentences.

J. The system as paragraph A recites, wherein the input word comprises a misspelled word.

K. A computing device comprising: an input port to receive an input word; and a processor communicatively coupled to the input port to: represent the input word as an n-dimensional representation; find a group of words that are morphologically similar to the input word; extract embedding of individual words among the group of words from an embedding matrix based, at least in part, on contextual information associated with the input word; and generate a target word having a meaning based, at least in part, on the group of words and the contextual information.

L. The computing device as paragraph K recites, wherein the n-dimensional representation comprises a bag-of-words or a one-hot vector.

M. The computing device as paragraph K recites, wherein the n-dimensional representation has a size equal to a size of a vocabulary that includes the input word.

N. The computing device as paragraph M recites, wherein the input word comprises two or more words of the vocabulary that are combined to form a single word.

O. The computing device as paragraph K recites, wherein the group of words that are morphologically similar to the input word is represented as a matrix.

P. The computing device as paragraph K recites, wherein the processor is configured to extract embedding of the individual words using deep neural networks.

Q. A method comprising: receiving an input word via an input port of a neural network; determining contextual information associated with the input word in a first branch of a neural network structure; determining morphological information associated with the input word in a second branch of the neural network structure; and generating a target word based, at least in part, on a weighted combination of the contextual information and the morphological information.

R. The method as paragraph Q recites, wherein the morphological information comprises a group of words morphologically associated with the input word.

S. The method as paragraph R recites, wherein the input word and each word of the group of words are one-hot vectors based, at least in part, on a language vocabulary.

T. The method as paragraph Q recites, wherein the first branch of the neural network structure is parallel with the second branch of the neural network structure.

Although the techniques have been described in language specific to structural features and/or methodological acts, it is to be understood that the appended claims are not necessarily limited to the features or acts described. Rather, the features and acts are described as example implementations of such techniques.

Unless otherwise noted, all of the methods and processes described above may be embodied in whole or in part by software code modules executed by one or more general purpose computers or processors. The code modules may be stored in any type of computer-readable storage medium or other computer storage device. Some or all of the methods may alternatively be implemented in whole or in part by specialized computer hardware, such as FPGAs, ASICs, etc.

Conditional language such as, among others, "can," "could," "might" or "may," unless specifically stated otherwise, are used to indicate that certain examples include, while other examples do not include, the noted features, elements and/or steps. Thus, unless otherwise stated, such conditional language is not intended to imply that features, elements and/or steps are in any way required for one or more examples or that one or more examples necessarily include logic for deciding, with or without user input or prompting, whether these features, elements and/or steps are included or are to be performed in any particular example.

Conjunctive language such as the phrase "at least one of X, Y or Z," unless specifically stated otherwise, is to be understood to present that an item, term, etc. may be either X, or Y, or Z, or a combination thereof.

Many variations and modifications may be made to the above-described examples, the elements of which are to be understood as being among other acceptable examples. All such modifications and variations are intended to be included herein within the scope of this disclosure.

What is claimed is:

1. A system comprising:
one or more processors; and
memory storing instructions that, when executed by the one or more processors, configure the one or more processors to perform operations comprising:

receiving a text-based object that includes an input word;

searching in a vocabulary space to find one or more words that correspond morphologically to the input word;

receiving contextual information associated with the input word and the one or more words that correspond morphologically to the input word; and based, at least in part, on the contextual information associated with the input word and the one or more words that correspond morphologically to the input word, modifying a morphological knowledge base during a machine learning process.

2. The system of claim 1, wherein the operations further comprise:

searching in a vocabulary space; and calculating morpheme similarity between or among the input word and the one or more words that correspond morphologically to the input word.

3. The system of claim 1, wherein the operations further comprise:

searching in a vocabulary space; and calculating syllable similarity between or among the input word and the one or more words that correspond morphologically to the input word.

4. The system of claim 1, wherein the operations further comprise predicting a target word or phrase having a meaning based, at least in part, on the contextual information and the one or more words that correspond morphologically to the input word.

5. The system of claim 1, wherein the operations further comprise determining the contextual information associated with the input word in a process that is parallel with and independent from determining the one or more words that correspond morphologically to the input word.

6. The system of claim 5, wherein the operations further comprise calculating a weighted sum of a representation of the contextual information and a representation of the one or more words that correspond morphologically to the input word.

7. The system of claim 1, wherein the input word and the one or more words that correspond morphologically to the input word are each represented by a one-hot vector.

8. The system of claim 1, wherein the one or more words that correspond morphologically to the input word are collectively represented by a matrix.

9. The system of claim 1, wherein the operations further comprise extracting the one or more words that correspond morphologically to the input word from one or more natural language text sentences.

10. The system of claim 1, wherein the input word comprises a misspelled word.

* * * * *